United States Patent Office 3,546,262
Patented Dec. 8, 1970

3,546,262
DIVALENT METAL OXIDE ACYLATES
Jacobus Rinse, Essex Bldg., Bernardsville, N.J. 07924
No Drawing. Filed Oct. 11, 1968, Ser. No. 766,976
Int. Cl. C08h 17/36
U.S. Cl. 260—414       20 Claims

ABSTRACT OF THE DISCLOSURE

Divalent metal oxide acylates are prepared simply from virtually any divalent metal or combination of two such metals. They are soluble in numerous organic solvents, with which liquid solutions containing from 60 to 90 percent (by weight) solids have been frequently obtained. When such solutions are applied to a solid substrate, they dry to tack-free, glossy protective coatings having excellent adherence.

BACKGROUND

Organometallic compounds have been the subject of considerable interest for a number of years. Increasing the metal content of such compounds by the formation of oligomers wherein metal atoms are bound to like or different metal atoms through oxygen bridges have been effected for a trivalent metal (USP 2,979,497), tetravalent metals (USP 2,980,719, USP 3,087,949 and USP 3,385,835) and combinations of divalent with tri- and tetravalent metals (British Pat. 972,804 and Rinse, J., "Metal Soaps," American Paint Journal, Mar. 13, 1967). In addition space tetramers and octamers of silicon are reported in USP 3,177,238 and USP 3,243,447, and organometallic compounds having a divalent metal and a tetravalent element (metal or non-metal) are described in British Pat. 1,010,074.

SUMMARY

This invention deals with a new group of organic metal derivatives and the preparation thereof. These derivatives are related to metaldiacylates or so-called metalsoaps, but possess a considerably higher metal content and different properties, being resins rather than soaps.

Said derivatives are divalent metal oxide acylates (DMOA) and consist simply of two metal atoms connected by an oxygen atom and with an acyloxy (carboxylic acid or dialkylphosphoric acid) group on each metal atom. However, two or more of these simple molecules form strongly bound associates (by secondary forces) which result in a non-crystalline, resinous structure similar to the cyclic trimer aluminum oxide acylates described in USP 2,979,497.

Divalent-metal diacylates, e.g. acetates, and the method of preparing them are known. Corresponding diacylates are prepared in the same manner as the known diacylates from virtually any divalent metal. DMOA is prepared from a metal (carboxylic acid) diacylate (MX$_2$) by removing one acyloxy group (X) by steam, followed by vacuum heating

   $MX_2 + H_2O \rightarrow HOMX + HX$   (a)

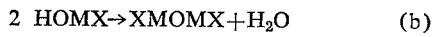   $2\ HOMX \rightarrow XMOMX + H_2O$   (b)

This removal of one acyloxy group is facilitated if the group has a small number of carbon atoms, e.g., 2 to 5. The resulting acids (HX) are volatile and distill off with steam. However, if acids of medium volatility, such as ethylhexoic and naphthenic acids are used simultaneously, small quantities of such acids may also be removed. Therefore a slight excess, e.g., 10% by weight, of such acids is used either in the beginning of the reaction or after the steam process to replace remaining, e.g., acetate groups. The higher fatty acids, such as those from tall oil and stearic acid, will not be removed under the conditions of the reaction.

Solutions of DMOA in organic solvents, applied in a thin layer on a solid substrate, e.g., glass, dry to tack-free, glossy, extremely adherent coatings. Any moisture on the surface of the substrate to which the solutions are applied apparently reacts with the resin (DMOA) and facilitates the formation of the resulting coating. DMOA also reacts with organic acids, such as those present in bodied linseed oils and in alkyd resins, binding the metal to the organic polymer.

Although DMOA differs from its corresponding regular metal soap with respect to solubility with low viscosity, reaction with moisture and acids, and adhesion, the functionality of the metal atom, e.g., as a drying or a stabilizing agent (vinyls) remains fully available and is even strengthened because of the higher metal content per unit weight. In those cases where viscosity increase by metal soaps is undesirable, the corresponding new compounds are preferably employed in lieu thereof.

It is an object of the instant invention to provide a divalent metal resin having a relatively high metal content. It is a further object that the functionality of the metal will be retained in the resin. Another object is to produce a substitute for metal soaps based on divalent metals, especially one from which solutions of low viscosity can readily be prepared even at materially increased metal content. An addtional object is to provide an adherent coating having a high divalent-metal content and which dries to a tack-free, glossy finish. Still further objects are apparent from the description which follows.

DETAILS

Although specific details may vary, each DMOA is prepared according to the same general processes irrespective of the divalent metal employed. The melting point of the DMOA varies with the divalent metal when the same carboxylic acid acylate or alkyl phosphate ligand is maintained; low melting point resins are obtained with such metals as zinc, lead and copper; intermediate melting point resins, with such metals as cobalt and manganese; and melting points in excess of 200° C. with such metals as alkaline earth metals, e.g. calcium and magnesium. The low melting point range may be considered from about 20° to 100° C.; the intermediate melting point range, from about 100° to 160° C.; and the high melting point range, above about 160° C. Although the preceding reflects a general relationship, the ligand may also be a determining factor in the melting point range. Abietic acid ligands, e.g., cause much higher melting points than those of ethylhexoic acid.

The solubility of DMOA in organic solvents is very good, particularly in aromatic hydrocarbons, such as toluene and xylene; in aliphatic hyrocarbons, such as mineral spirts; in lower alkanols, e.g., methanol, ethanol, isopropanol, hexanol and octanol; and in ketones, such as acetone and methylethylketone. With these and similar solvents solutions of DMOA are frequently obtained with from 60 to 90 percent by weight of solids based on the weight of the total solution.

Both divalent metal atoms in DMOA need not be of the same divalent metal. The same procedure as is represented by equations (a) and (b) is employed to combine two different divalent metals in a single molecule of DMOA, e.g., XZnOCdX and XCuOHgX, each X being either a carboxylic or dialkylphosphoric acyloxy ligand bonded directly to a metal atom. The particular ligand influences the solubility of the DMOA whether both divalent metal atoms are the same or different.

The preferred carboxylic acyloxy ligands are those having at least seven carbon atoms. Although there is no critical upper limit on the number of carbon atoms, from twenty to twenty-two carbon atoms is a practical upper limit. The acyl of the acyloxy is preferably a hydrocarbon monobasic aliphatic, cycloaliphatic or combined cycloaliphatic aliphatic carboxylic acid acyl from, e.g., n-heptanoic acid, ethyl hexoic acid, naphthenic acid (a monobasic acid with at least one cycloaliphatic ring and from 6 to 29 carbon atoms, e.g., cyclopentane carboxylic acid, 3-methylcyclopentylacetic acid, camphonamic acid and 2,2,6-trimethylcyclohexanecarboxylic acid), lauric acid, palmitic acid, stearic acid, oleic acid, linoleic acid, linolenic acid, abietic acid or behenic acid; it can also be from an aromatic acid, e.g., benzoic acid. As is known, some metal oxides, such as those of lead, mercury and copper, react with unsaturated fatty acids; when these particular metals are employed, it is therefore preferred to use only saturated (alkanoic) acyloxy ligands.

Each alkyl group of the dialkylphosphoric acid acyloxy ligands has at least five carbon atoms. Again, there is not a critical upper limit, but there is a practical upper limit of about eighteen carbon atoms in each such alkyl group. Illustrative alkyls are, e.g., pentyl, heptyl, nonyl, decyl, dodecyl, hexadecyl and octadecyl. The dialkylphosphoric acid is an orthophosphoric acid.

In the same manner that the divalent metals may differ, the ligands attached thereto may also differ in the same DOMA molecule. One ligand may be a carboxylic acid acyloxy ligand and the other, a dialkylphosphoric acid acyloxy ligand.

To prepare DMOA, a reaction is initiated between either a mixture of divalent metal diacylate (the acyl of which has from 2 to 6 carbon atoms, e.g., acetate and propionate) and an aliphatic carboxylic acid of low volatility (having a carbon-to-carbon chain of at least seven carbon atoms, e.g., ethylhexanoic acid) or a mixture of (a) divalent metal, divalent metal oxide, divalent metal hydroxide or divalent metal carbonate and (b) an equivalent mixture of aliphatic carboxylic acid of high volatility (having a carbon-to-carbon chain of from 2 to 6 carbon atoms, e.g., acetic acid and propionic acid) and either aliphatic carboxylic acid of low volatility or dialkylphosphoric acid.

Exemplary divalent metal diacylates are: zinc diacetate, cobalt diacetate and calcium diacetate. Suitable divalent metals are: zinc, lead and copper. Illustrative divalent metal oxides are: mercuric oxide and lead oxide. Typical divalent metal hydroxides are: copper hydroxide and calcium hydroxide. The divalent metal carbonates include, e.g., zinc carbonate and magnesium carbonate.

Usually some solvent, such as a hydrocarbon solvent, e.g., xylene or mineral spirits (having a boiling point either from 150° to 170° C. or from 220° to 240° C.), is employed to maintain the batch as a liquid. After the liquid batch becomes clear, steam is blown into it at constant temperature, or water is dropped in slowly, keeping the temperature at a predetermined level. The viscosity of the batch during steaming decreases rather rapidly and, with most metals, becomes very low, e.g., from about 100 poises to 1 poise, at a temperature of 200° C. or lower. Metals, such as calcium, magnesium and, to a lesser extent, cobalt and manganese, require heating above 200° C., sometimes even above 250° C., before the batch thins down. Usually, after 15 to 20 minutes the distillation of acids ends, steaming is terminated and vacuum of up to 5 cm. $H_2O$ is applied. Most DMOA releases water and solvent slowly. The condensation of the basic metal acylates to their anhydrides proceeds slowly, but always practically completely. Complete removal of solvents is not always possible. Low viscosity during vacuum, without any more condensate, indicates the end of the reaction. The addition of a small quantity of toluene or other volatile solvent, e.g., hexane, assists in the removal of water and high boiling solvents.

The preferred highly volatile acids are acetic and propionic acid; butyric and valeric acids may also be used. However, with some metals small quantities of the latter acids may remain after the steam distillation. For economic reasons acetic acid is used most frequently.

The specific metal also determines the rate of removal of the acid, which is more difficult for calcium and barium than for zinc, copper or mercury.

The reaction temperature varies from 105° to 260° C., being lowest for copper and mercury.

The steaming process requires from 10 to 60 minutes. A convenient variation is to drop water slowly into the reacting batch under good agitation, keeping the temperature at a level determined experimentally for each metal.

The end point of the reaction is reached when no more acid appears in the distillation or, in some cases, by the appearance of turbidity (zinc and lead) in the batch.

Sometimes the reaction is facilitated by the addition to the reaction medium of a volatile alcohol, such as butanol, which helps the dehydration of the intermediary hydroxy metal acylate formed, e.g., when the metal is either calcium or magnesium. Ethyl alcohol may even be used for some metals, such as zinc, instead of steam because it esterifies the acyloxy groups and leaves hydroxyl bound to the metal:

$$MX_2 + ROH \rightarrow XMOH + RX \qquad (c)$$

With most metals the removal of one acyloxy group leaves a clear resin, but with zinc and lead the complete removal causes the formation of an insoluble turbidity. Therefore the reaction has to be halted somewhat earlier, e.g., when 80% of the metal atoms have been converted into MOM structures.

Although the hydrocarbon-solubility of DMOA is good, it may be improved and the melting point lowered by heating the DMOA with from 3 to 10% by weight of condensed ethylsilicate, with an alkoxide of aluminum, titanium, zirconium or tin or with a combined oligomer of both, as disclosed in copending application SN 741,899, filed July 2, 1968. These additions remove remaining acetate radicals.

DMOA can be reacted with other oligomers of metals having valences of three and four according to the following reaction schemes:

$$3 \; XMOMX + (OM'X)_3 \rightarrow 3 \; XMOM'(X)OMX \qquad (d)$$
$$XMOMX + (RO)_3M''OM''(OR)_3 \rightarrow$$
$$\qquad 2 \; (RO)_3M''OMX \qquad (e)$$
$$6 \; XMOMX + X_4M''_4O_6 \rightarrow 4 \; (XMO)_3M''X \qquad (f)$$
$$2 \; XMOMX + (RO)_3M''OM''(OR)_2OM''(OR)_3 \rightarrow$$
$$\qquad 2 \; XMOM''(OR)_3 + XMOM''(OR)_2OMX \qquad (g)$$

wherein each of M and X has its above-ascribed meaning, but:

X is preferably carboxylic acid acyloxy;
M' is a trivalent metal;
M'' is a tetravalent metal; and
R is lower alkyl, e.g., ethyl.

The reactions are effected with heat, and the products are oligomers having a high metal content and useful as acid binders, varnish stains, tinting colors for white paints, wood preservatives, corrosion inhibitors, leather waxes, stabilizers and rubber compounding additives.

DMOA is useful, per se, for a great variety of applications, e.g., concentrated driers for paints and inks, stabilizers for vinyls, fungicides, anti-corrosives, anti-fouling paints, adhesion promotors and colorants.

The metal content is from 50 to 80% higher than for the corresponding metal diacylate.

The structure XMOMX has been confirmed by infrared spectographic analysis, indicating the absence of hydroxy groups and the presence of predominantly one type of acyloxy groups.

The use of more than one equivalent of non-volatile acid per metal atom will decrease the yield of metal oxide acylate and increase the metal diacylate yield. In general an excess of one half equivalent of non-volatile acid per metal atom does not considerably change the nature of the products. As the excess of acid is increased beyond that amount, the properties gradually approach those of the regular metal diacylates.

The examples which follow are presented by way of illustration, not limitation.

Example I 50 grams (g.) of naphthenic acid (Ac.Val.214), 12 g. of acetic acid and 20 g. of mineral spirits are heated with 20.6 g. of copper hydroxide to 150° C. When the resulting reaction mixture becomes clear, 50 g. of water and 20 g. of butanol are added thereto at a temperature of from 150° to 180° C. Then 7 g. of naphthenic acid are added. After applying vacuum at 170° C., a further addition of 20 g. of xylene is made to the reaction mixture. The resulting product is a green liquid which, on exposure to air, forms a tack-free transparent green coating. The copper content is 18% by weight of the solids, as compared to 11.3% by weight of the solids for corresponding commercial copper naphthenate. Said product, diluted with mineral spirits, is a preservative for wood and burlap bags.

Replacing the copper hydroxide [$Cu(OH)_2$] with an equivalent of strontium hydroxide [$Sr(OH)_2$] results in the preparation, in similar manner, of the corresponding strontium oligomer.

Example II 11.7 g. of magnesium hydroxide are added to a solution of 12 g. of acetic acid and 56 g. of tall oil fatty acids in 50 g. Isopar M (a hydrocarbon solvent with B.P. 220° to 240° C.); 20 g. of water are added to the resultant at 220° C. and the temperature is then raised to 250° C., adding 30 g. more of Isopar thereto when the viscosity increases. Thereafter, 35 g. of water are slowly dropped in, alternating with 25 g. of butanol. After applying a vacuum, 55 g. of a hard light brown resin (M.P. 190° C.), which is soluble in a mixture of xylene and butanol, is obtained. (Apparently 7 g. of tall oil fatty acid is also removed by the high temperature.) The resin is useful as a varnish component.

Replacing the magnesium hydroxide [$Mg(OH)_2$] with an equivalent of stannous hydroxide [$Sn(OH)_2$] results in the preparation, in similar manner, of the corresponding tin oligomers. Replacing the tall oil fatty acids with an equivalent of n-heptanoic acid results in the preparation, in similar manner, of the magnesium oligomer with the corresponding ligand.

Example III 44.6 g. of litharge are added at 60° C. to a mixture of 50 g. of naphthenic acid, 12 g. of acetic acid and 20 g. of xylene. At 200° C. 25 ml. of water are dropped in and a vacuum is applied. 95.8 g. of a clear dark resin with 43% lead are obtained. This resin can be used as a drier for bodied linseed oils.

Replacing the naphthenic acid with an equivalent of stearic acid and the litharge with an equivalent of barium hydroxide [$Ba(OH)_2$] results in the preparation, in similar manner of the corresponding barium oligomer with stearate ligands.

Example IV 22.3 g. of litharge and 9.8 g. of cobalt hydroxide are added to a solution of 29 g. of ethylhexoic acid and 15 g. of acetic acid in 20 g. of xylene. At 220° C. 20 ml. of water are dropped into the resulting reaction mixture; 25 g. of xylene are then added thereto and a vacuum is applied at 230° C. The product, which is dissolved in 10 g. of xylene, contains 34.7% lead and 10% cobalt on a solids basis. It is useful as a dryer for oil paints. Its structure is XPbOCoX in which X is ethylhexate.

Replacing the litharge with an equivalent of ferrous oxide [FeO] and the ethylhexoic acid with an equivalent of cyclopentanecarboxylic acid results in the preparation, in similar manner, of the corresponding oligomer.

Example V 12.8 g. of cadmium oxide and 8.1 g. of zinc oxide are added at 60° C. to a solution of 56 g. of isostearic and 12 g. of acetic acid in 40 g. of Isopar M (see Example II). At 200° C. 20 g. of water and 5 g. of butanol are added to the thus obtained reaction mixture. The temperature is then raised to 250° C. and a vacuum applied, yielding 74.5 g. of a brown solid resin melting above 150° C. and having the formula XZnOCdX. This resin is useful as a stabilizer for vinyl polymers.

Replacing the cadmium oxide [CdO] with an equivalent of nickelous oxide [NiO] and the isostearic acid with an equivalent of 3-methylcyclopentylacetic acid results in the preparation, in similar manner, of the corresponding oligomer.

Example VI

The process of Example III is repeated with 43.2 g. of ethylhexoic acid, 18 g. of acetic acid and 67 g. of litharge. A clear resin is obtained containing 54% lead. This resin is useful in the same manner as that prepared in accord with Example III.

Replacing the litharge with an equivalent of strontium hydroxide [$Sr(OH)_2$] and the ethylhexoic acid with an equivalent of cyclopentylacetic acid results in the preparation, in similar manner, of the corresponding oligomer.

Example VII 22.3 g. of lead oxide and 8.1 g. of zinc oxide are added at 60° C. to 50 g. of naphthenic acid with 12 g. of acetic acid and 20 g. of xylene. 25 g. of water are dropped into the resulting reaction mixture at a temperature between 170° and 230° C. A clear dark colored resin containing 25% by weight of lead and 10% by weight of zinc, soluble in toluene, is obtained. This resin is useful as a paint drier.

Example VIII 50 g. of naphthenic acid, 7.2 g. of ethylhexoic acid and 10.5 g. of acetic acid are heated with 40 g. of mineral spirits to 50° C. 19.4 g. of cobalt hydroxide are added to the resulting reaction mixture and 20 g. of water are dropped therein at 190° C. A vacuum is applied and the temperature is raised to 210° C. Thereafter, 7 g. of titanium isopropoxide-ethylsilicate oligomer are added and the thus-obtained reaction mixture is maintained for 30 minutes at 190° C. A vacuum is applied again. The resulting product is a soft resin which is readily soluble in xylene. The metal content of the resin is 16% by weight of cobalt based on total solids. This soft resin is useful as a drier for alkyd resins.

Replacing the cobalt hydroxide [$Co(OH)_2$] with an equivalent of barium hydroxide [$Ba(OH)_2$] and the naphthenic acid with an equivalent of linoleic acid results in the preparation, in similar manner, of the corresponding oligomer.

Example IX

The process of Example VIII is repeated with 49.1 g. of manganese acetate in lieu of the cobalt hydroxide. The resulting dark brown resin has a metal content of 16% by weight of manganese and is useful as a drier for oven drying coatings.

Replacing the manganese with an equivalent of nickelous acetate and the naphthenic acid with an equivalent of linolenic acid results in the preparation, in similar manner, of the corresponding oligomer.

Example X 60 g. of rosin are dissolved in 30 g. of xylene with 12 g. of acetic acid. Then 16.2 g. of zinc oxide are added thereto with 15 g. of Isopar M. Steam is blown in at 180°

C. until the viscosity of the then obtained reaction mixture decreases considerably. Under vacuum at 200° to 240° C. a slow release of vapor occurs, leaving a clear resin with M.P. above 150° C. and containing 16.5% by weight of zinc. (The highest Zn content in known zinc rosinate is 12%.) This zinc oligomer is useful as a component for varnishes.

Replacing the zinc oxide with an equivalent of chromous hydroxide [$Cr(OH)_2$] and the rosin with an equivalent of oleic acid results in the preparation, in similar manner, of the corresponding oligomer.

Example XI 16.2 g. of zinc oxide are added to a mixture of 50 g. of naphthenic acid and 12 g. of acetic acid in 30 g. of xylene. The batch becomes clear at 100° C. and is heated to 180° C., at which temperature 22 g. of water are dropped in slowly. A slight turbidity is removed by adding thereto 1.5 g. of acetic acid. A vacuum is applied to the resultant and a soft clear resin is obtained with a zinc content of 19.8%. The product is soluble in mineral spirits and is useful as a wood preservative. A similar product is obtained by replacing the acetic acid by 15 g. of propionic acid. The zinc content of the latter is 19.2%. By replacing the acetic acid with 21 g. of valeric acid, a similar product with a zinc content of 18.3% is obtained.

Replacing the zinc oxide with an equivalent of zinc carbonate and the naphthenic acid with an equivalent of abietic acid results in the preparation, in similar manner, of the corresponding oligomer.

Example XII 49 g. of manganese acetate are added to a solution of 50 g. of naphthenic acid in 30 g. of Isopar M. The clear solution obtained becomes turbid at 200° C., but clarifies when 25 g. of water are dropped in. The color gradually turns to dark brown. After applying a vacuum thereto, 61.6 g. of hard resin is obtained (theoretically 61.4 g. for NMnOMnN). The resin is readily soluble in xylene and is useful as a drier for paints. It contains 17.8% by weight of Mn.

Replacing the manganese acetate with an equivalent of stannous acetate and the naphthenic acid with an equivalent of palmitic acid results in the preparation, in similar manner, of the corresponding oligomer.

Example XIII

The procedure of Example XII is repeated with 11.7 g. of magnesium hydroxide and 12 g. of acetic acid in 55 g. of naphthenic acid. Steaming at 240° C. causes a loss of naphthenic acid which is corrected by the addition of 6 g. of naphthenic acid to the resulting reaction mixture prior to subjecting same to a vacuum. The final yield is 65 g. of hard resin, melting at 200° C. and soluble in xylene and butanol. This hard resin is useful as an acid binder for lubricating oils.

Replacing the magnesium hydroxide wtih an equivalent of ferrous hydroxide [$Fe(OH)_2$] and the naphthenic acid with an equivalent of behenic acid results in the preparation, in similar manner, of the corresponding oligomer.

Example XIV

The procedure of Example III is repeated with 56 g. of isostearic acid, 12 g. of acetic acid and 44.6 g. of litharge. The final product is a clear soft resin with 40% by weight of lead. It is useful as a component for high pressure lubricants.

Replacing the litharge with an equivalent of barium carbonate and the isostearic acid with an equivalent of 2,2,6-trimethylcyclohexane-carboxylic acid results in the preparation, in similar manner, of the corresponding oligomer.

Example XV

The procedure of Example III is repeated with 19.4 g. of cobalt hydroxide and 56 g. of isostearic acid. After steaming, 10 g. of butanol are added thereto, and a vacuum is applied at 250° C. The yield is 75 g. of a clear blue resin melting at 150° C. and having a cobalt content of 15.7% by weight. This resin is useful as a paint dryer.

Replacing the cobalt hydroxide [$Co(OH)_2$] with an equivalent of cobalt carbonate and the naphthenic acid with an equivalent of arachidic acid results in the preparation, in similar manner, of the corresponding oligomer.

EXAMPLE XVI (a) 16.2 g. of zinc oxide are added to 56 g. of isostearic acid with 12 g. of acetic acid and 30 g. of xylene. After the addition thereto at 180° C. of 17 g. of water and flushing with toluene, 3 g. of a mixture of titanium isopropoxide-ethylsilicate are added and the temperature kept for 30 minutes at 190° to 200° C. The product (76 g.) is a clear oil slowly changing into a soft paste having 17.1% by weight of zinc.

(b) Same procedure with 3 g. of ethylsilicate 40 yielded 75.6 g. of a soft paste.

(c) Same procedure with 3 g. of zirconium butoxide yielded 77 g. of a soft paste.

(d) Same procedure with 3 g. of titanium isopropoxide yielded 75.9 g. of a paste slightly harder than (b).

Each of the products of this example is useful as a coating material for glass fibers.

Replacing the zinc oxide with an equivalent of chromous acetate results in the preparation, in similar manner, of the corresponding oligomers.

EXAMPLE XVII 16.2 g. of zinc oxide are added to a solution of 64.4 g. of bis-ethylhexylphosphate and 12 g. of acetic acid in 30 g. of xylene. The batch becomes clear at 110° C. and is treated at 180° C. with 20 g. of water, flushed with 10 g. of xylene and put under vacuum. A yield of 82.4 g. of a soft resin, useful as a wood preservative, is obtained.

Replacing the bis-ethylhexylphosphate with an equivalent of bisphenyl acid phosphate results in the preparation, in similar manner, of the corresponding oligomer.

EXAMPLE XVIII 37 g. of ethylhexoic acid, 12 g. of acetic acid and 30 g. of xylene are mixed with 43.4 g. of yellow mercuric oxide. The batch becomes clear at 100° C. 200 g. of water are dropped in slowly to remove acetic acid. Occasionally toluene (50 g.) is added to lower viscosity. Finally the batch becomes a thin liquid. 20 g. of toluene are added to flush out remaining water and to facilitate condensation to XHgOHgX. The final product is a soft, transparent, resin soluble in xylene. Its Hg content is 51%. It is useful as a fungicide.

With mercury the temperature of steaming cannot exceed 130° C. because the oxide decomposes to metal.

Replacing the mercuric oxide with an equivalent of mercuric acetate and the ethylhexoic acid with an equivalent of octanoic acid results in the preparation, in similar manner, of the corresponding oligomer having the same utility.

EXAMPLE XIX 65 g. of technical zinc oxide tallate are heated together with 35 g. of iron oxide tallate $(OFeT)_3$. After ten minutes at 200° C. the batch becomes homogeneous and transparent in a thin layer. After cooling to room temperature a dark brown viscous oil (100 g.) is obtained of the formula TZnOFe(T)OZnT. This product is identical to a product prepared directly from zinc oxide, basic ferric acetate and tall oil fatty acids. The product is soluble in mineral spirits. Upon addition to a mineral spirit solution thereof of 0.5 percent by weight of cobalt drier, said solution dries in about 90 minutes to a clear high gloss protective coating for virtually any solid substrate, e.g., wood.

EXAMPLE XX 74 g. of technical zinc oxide tallate are heated to 180° C. with 30 g. of condensed ethyl silicate (40% $SiO_2$).

After 20 minutes the batch becomes homogeneous and, on cooling, remains clear. A yield of 102 g. of a light brown oil which, with cobalt drier, dries to a hard clear coating is obtained. The main component of the oil is TZnOSi(OC$_2$H$_5$)$_3$. The coating is used as a preservative.

EXAMPLE XXI 74 g. of technical zinc oxide tallate are heated to 200° C. with 22.4 g. of titanium oxide stearate (St$_4$Ti$_4$O$_6$) until the batch is homogenous. It solidifies to hard light brown wax, soluble in mineral spirits. This wax is useful as a water repellent.

The invention and its advantages are readily understood from the preceding description. Various changes may be made in the specific reactants and final products without departing from the spirit or scope of the invention or sacrificing its material advantages.

What is claimed is:

1. An oligomer which is a divalent metal oxide acylate of the formula:

XMOMX wherein:

each X is an acyloxy ligand, the acyl of which is selected from the group consisting of carboxylic acid acyl and dialkylphosphoric acid acyl; each carboxylic acid acyl has from 6 to 29 carbon atoms; each alkyl of the dialkylphosphoric acid acyl has from 5 to 18 carbons; and each M is a divalent metal atom.

2. An oligomer according to claim 1 wherein the acyloxy of each ligand is a carboxylic acid acyloxy.

3. An oligomer according to claim 2 wherein each X is non-aromatic.

4. An oligomer according to claim 3 wherein the carboxylic acid, RCOOH, of each acyloxy ligand is one wherein R is an aliphatic hydrocarbon chain having from 6 to 21 carbon atoms.

5. An oligomer according to claim 4 wherein R is saturated.

6. An oligomer according to claim 2 wherein the carboxylic acid is a naphthenic acid.

7. An oligomer according to claim 1 wherein at least one M is a member selected from the group consisting of lead, mercury and copper and X is an alkanoic acyloxy ligand.

8. An oligomer according to claim 7 wherein the member is lead.

9. An oligomer according to claim 1 wherein at least one M is an alkaline earth metal.

10. An oligomer according to claim 9 wherein the alkaline earth metal is calcium.

11. An oligomer according to claim 9 wherein the alkaline earth metal is magnesium.

12. A low-melting-point oligomer according to claim 1 having a melting point of between about 20 and 100° C.

13. An oligomer according to claim 12 wherein at least one M is zinc.

14. An oligomer according to claim 12 wherein at least one M is copper.

15. An oligomer according to claim 1 wherein at least one M is cobalt.

16. An oligomer according to claim 1 wherein at least one M is manganese.

17. An oligomer according to claim 1 wherein at least one M is cadmium.

18. An oligomer according to claim 1 wherein at least one M is mercury.

19. A method of preparing an oligomer according to claim 1 which comprises replacing one acyloxy of a divalent metal diacylate by a hydroxy group and condensing the product to the oligomer.

20. An oligomer according to claim 1 wherein the acyloxy of each ligand is a dialkylphosphoric acid acyloxy wherein each alkyl has from 5 to 18 carbon atoms.

References Cited

UNITED STATES PATENTS

| | | | |
|---|---|---|---|
| 2,507,055 | 5/1950 | Smith et al. | 260—963 |
| 3,047,607 | 7/1962 | Thayer | 260—963 |
| 3,432,445 | 3/1969 | Osgan et al. | 260—438.5 |

FOREIGN PATENTS

| | | | |
|---|---|---|---|
| 271,350 | 7/1964 | Australia | 260—429.9 |
| 547,737 | 11/1959 | Belgium | 260—414 |
| 663,443 | 5/1963 | Canada | 260—414 |

LEWIS GOTTS, Primary Examiner

E. G. LOVE, Assistant Examiner

U.S. Cl. X.R.

106—2, 13, 264, 310; 117—167, 135.5; 252—194, 35; 260—45.75, 429, 429.3, 429.9, 431, 435, 438.1, 438.5, 514, 952, 953; 424—288, 289, 291, 293, 295